(12) United States Patent
Xu et al.

(10) Patent No.: US 10,468,848 B2
(45) Date of Patent: Nov. 5, 2019

(54) ELECTRICAL CONNECTOR WITH ANTI-SHORTING STRUCTURE AND METHOD MAKING THE SAME

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Yin-Chao Xu, Kunshan (CN); Wei Zhong, Kunshan (CN); Jian-Kuang Zhu, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 16/198,881

(22) Filed: Nov. 23, 2018

(65) Prior Publication Data
US 2019/0157827 A1    May 23, 2019

(30) Foreign Application Priority Data

Nov. 23, 2017   (CN) .......................... 2017 1 1181130
Nov. 23, 2017   (CN) .......................... 2017 1 1181767
(Continued)

(51) Int. Cl.
*H01R 43/24*    (2006.01)
*H01R 13/518*   (2006.01)
(Continued)

(52) U.S. Cl.
CPC ............. *H01R 43/24* (2013.01); *B29C 45/00* (2013.01); *H01R 13/405* (2013.01);
(Continued)

(58) Field of Classification Search
CPC ............. H01R 13/514; H01R 13/6582; H01R 13/6591; H01R 13/504; H01R 13/518;
(Continued)

(56) References Cited

U.S. PATENT DOCUMENTS 9,525,241 B1 * 12/2016  Su ...................... H01R 13/6581
9,912,111 B2 *  3/2018  Little ..................... H01R 24/60
(Continued)

FOREIGN PATENT DOCUMENTS

CN      104300262 A      1/2015
CN      105261892 A      1/2016
(Continued)

*Primary Examiner* — Abdullah A Riyami
*Assistant Examiner* — Nader J Alhawamdeh
(74) *Attorney, Agent, or Firm* — Wei Te Chung; Ming Chieh Chang

(57) ABSTRACT

An electrical connector includes a pair of terminal modules sandwiching a metallic shielding plate via an insert-molding process and sandwiched between a pair of metallic shells to be commonly enclosed within an insulative front/inner housing via a first stage over-molding process and an insulative rear/outer housing via a second stage over-molding process. The rear housing forms a base from which the mating tongue of the front housing forwardly extends. A plurality of first positioning holes extend through the shielding plate, the pair of insulators, the pair of metallic shells. A plurality of second positioning holes extend through the front housing and the rear housing. The first positioning holes are filled with either glue or material of the rear housing, depending upon positional relation with the corresponding second positioning holes.

19 Claims, 17 Drawing Sheets

US 10,468,848 B2
Page 2

(30) Foreign Application Priority Data

Nov. 23, 2017 (CN) .......................... 2017 1 1182212
Nov. 23, 2017 (CN) .......................... 2017 1 1182452

(51) Int. Cl.
| | | |
|---|---|---|
| *H01R 13/504* | (2006.01) | |
| *H01R 13/405* | (2006.01) | |
| *B29C 45/00* | (2006.01) | |
| *H01R 107/00* | (2006.01) | |
| *H01R 24/60* | (2011.01) | |
| *H01R 13/6585* | (2011.01) | |

(52) U.S. Cl.
CPC ......... *H01R 13/504* (2013.01); *H01R 13/518* (2013.01); *H01R 13/6585* (2013.01); *H01R 24/60* (2013.01); *H01R 2107/00* (2013.01)

(58) Field of Classification Search
CPC .... H01R 13/6585; H01R 43/24; H01R 24/60; B29C 45/00

USPC ................................................ 439/607.08
See application file for complete search history.

(56) References Cited

U.S. PATENT DOCUMENTS

| | | | | |
|---|---|---|---|---|
| 2017/0338585 A1* | 11/2017 | Wang | ................. | H01R 13/5202 |
| 2017/0365955 A1* | 12/2017 | Li | ...................... | H01R 13/5202 |
| 2019/0157827 A1* | 5/2019 | Xu | ......................... | H01R 43/24 |

FOREIGN PATENT DOCUMENTS

| | | |
|---|---|---|
| CN | 105846208 A | 8/2016 |
| CN | 205621926 U | 10/2016 |
| CN | 206004086 U | 3/2017 |
| CN | 104795665 B | 5/2017 |

\* cited by examiner

ELECTRICAL CONNECTOR WITH ANTI-SHORTING STRUCTURE AND METHOD MAKING THE SAME

BACKGROUND OF THE DISCLOSURE

1. Field of the Disclosure

The present disclosure relates to an electrical connector, and more particularly to an electrical connector structured without risks of shorting among the outer metallic shell, the inner shielding plate and the metallic coating upon the exterior surface of the cover.

2. Description of Related Arts

CN patent No. 2060004086 and U.S. Pat. No. 9,647,395 discloses an electrical connector assembly including a receptacle connector and a plug connector mated with each other. The plug connector includes a base and a tongue portion extending forwardly from the base. The plug is essentially composed of a pair of terminal modules sandwiching a metallic shielding plate therebewteen. A pair of metallic shell are applied upon the pair of terminal modules. Because the base forms a plurality of positioning holes extending therethrough for further applying thereon an outer cover/base which is coated with a sputter layer, there is a risk of shorting/contamination between the applied sputtering layer and the corresponding shielding plate rim and metallic shell rim exposed in the positioning holes. Another problem is regarding the rear face/edge of metallic shell is located too close to the rear face of the over-molding housing, thus resulting in inevitable cracking of the rear portion of the housing thereabouts to expose the rear face/edge of the metallic shell that may also bring about the risk of shorting with the sputtering layer.

An improved plug connector is desired.

SUMMARY OF THE DISCLOSURE

An object of the invention is to provide an electrical connector with an anti-shorting structure around the positioning hole. Another object of the invention is to providing an electrical connector with the outer cover veiling the edge of the metallic shell for not only avoiding shorting risk but also reinforcing the whole structure.

To achieve the above object, an electrical connector includes a pair of terminal modules sandwiching a metallic shielding plate and sandwiched between a pair of metallic shells to be commonly enclosed within an insulative front/inner housing and an insulative rear/outer housing. Each terminal module includes a plurality of terminals integrally formed with an insulator. The front insulative housing forms a mating tongue with opposite mating surfaces. The terminal includes a contacting section exposed upon the mating surface. The shielding plate is exposed outside of the rear housing. The rear housing forms a base from which the mating tongue forwardly extends. The terminal includes a tail section exposed outside of the base. A plurality of first positioning holes extend through the shielding plate, the pair of insulators, the pair of metallic shells. A plurality of second positioning holes extend through the front housing and the rear housing. The first positioning holes are either vertically aligned with or transversely offset from the second positioning holes, respectively. The plurality of first positioning holes are filled with either glue if vertically aligned with the plurality of second positioning holes, or material of the rear housing if transversely offset from the plurality of second positioning holes, before a sputter coating is applied upon the connector, thus avoiding the potential shorting/contamination risk.

Other objects, advantages and novel features of the disclosure will become more apparent from the following detailed description when taken in conjunction with the accompanying drawings.

DETAILED DESCRIPTION OF THE PREFERRED EMBODIMENT

Figure 1:
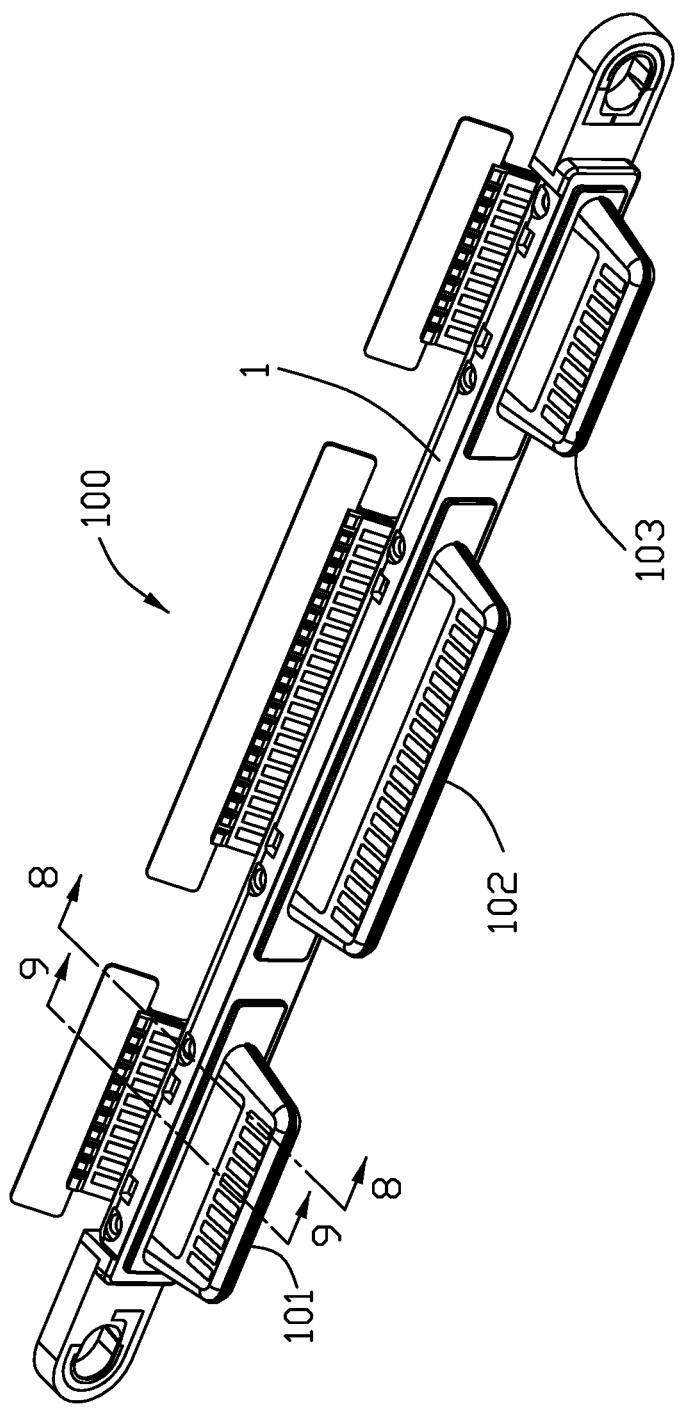
FIG. 1 is a perspective view of an electrical connector according to a first embodiment of the invention.
Figure 2:
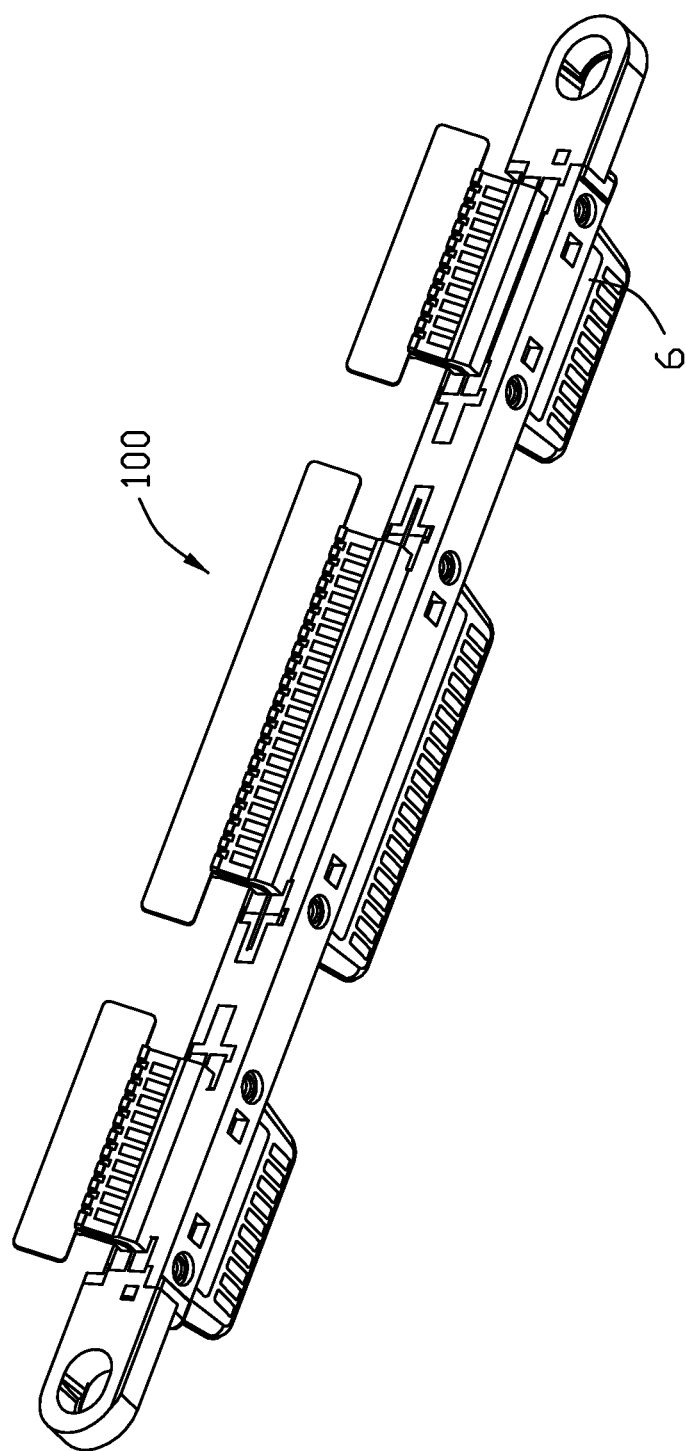
FIG. 2 is another perspective view of the electrical connector of FIG. 1.
Figure 3:
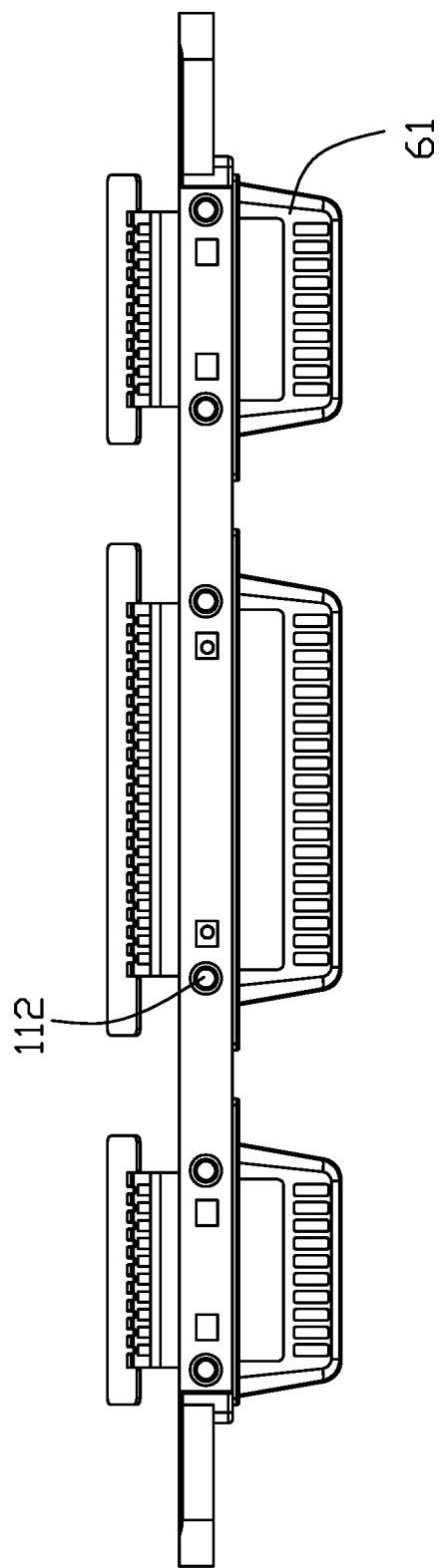
FIG. 3 is a top view of the electrical connector of FIG. 1.
Figure 4:
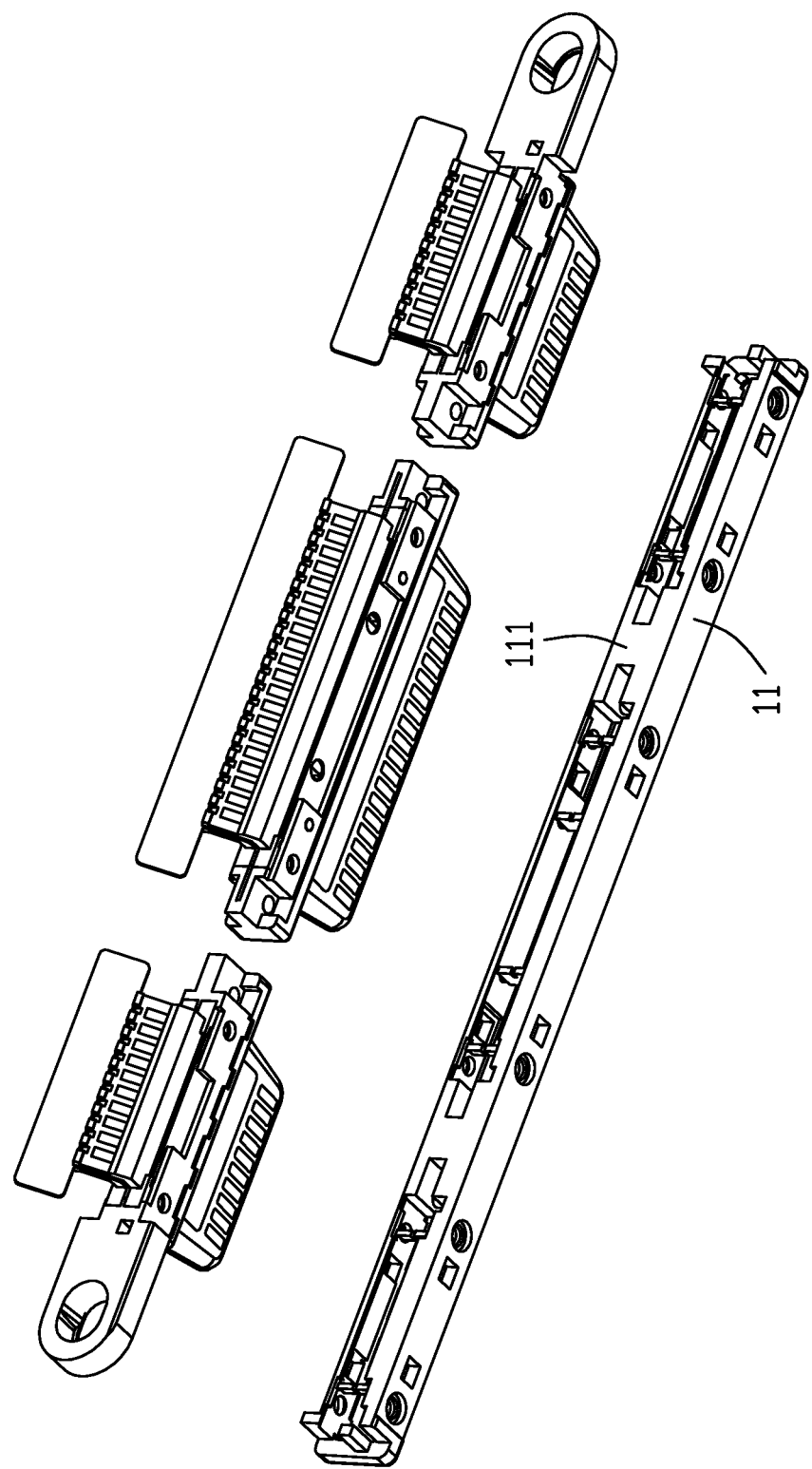
FIG. 4 is an exploded perspective view of the electrical connector of FIG. 1.
Figure 5:
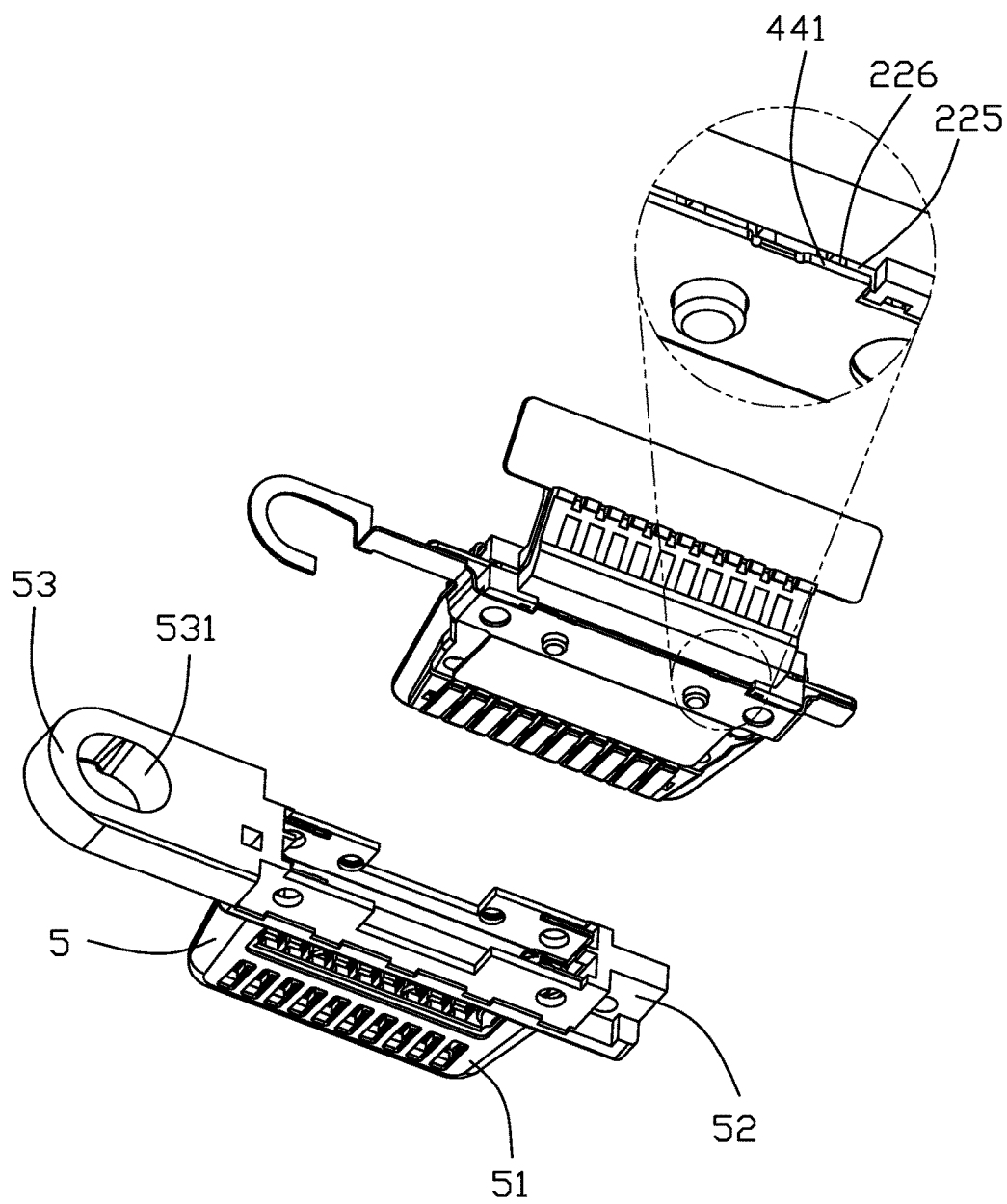
FIG. 5 is a further exploded perspective view of a portion of the electrical connector of FIG. 4.
Figure 6:
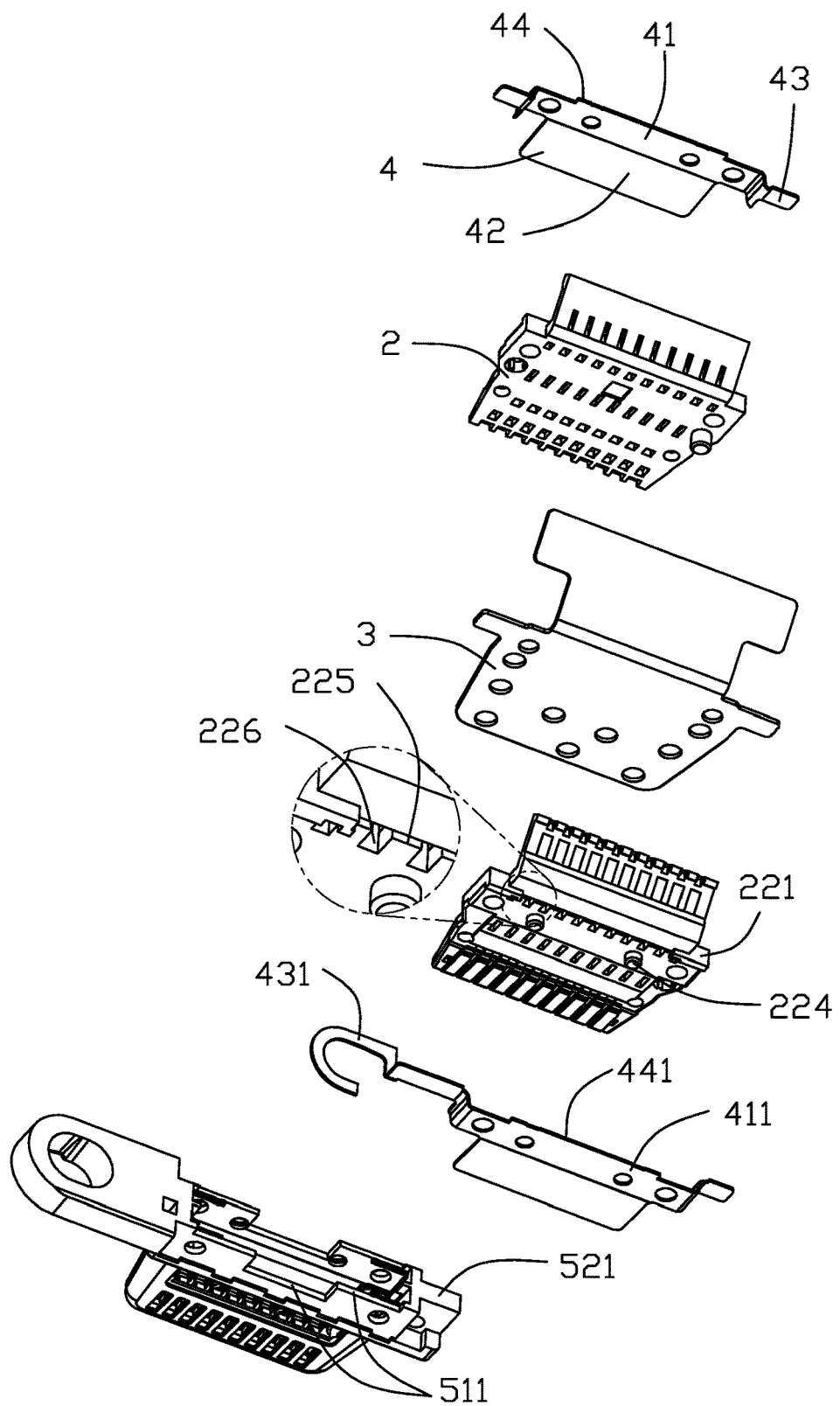
FIG. 6 is a further exploded perspective view of the portion the electrical connector of FIG. 5.
Figure 7:
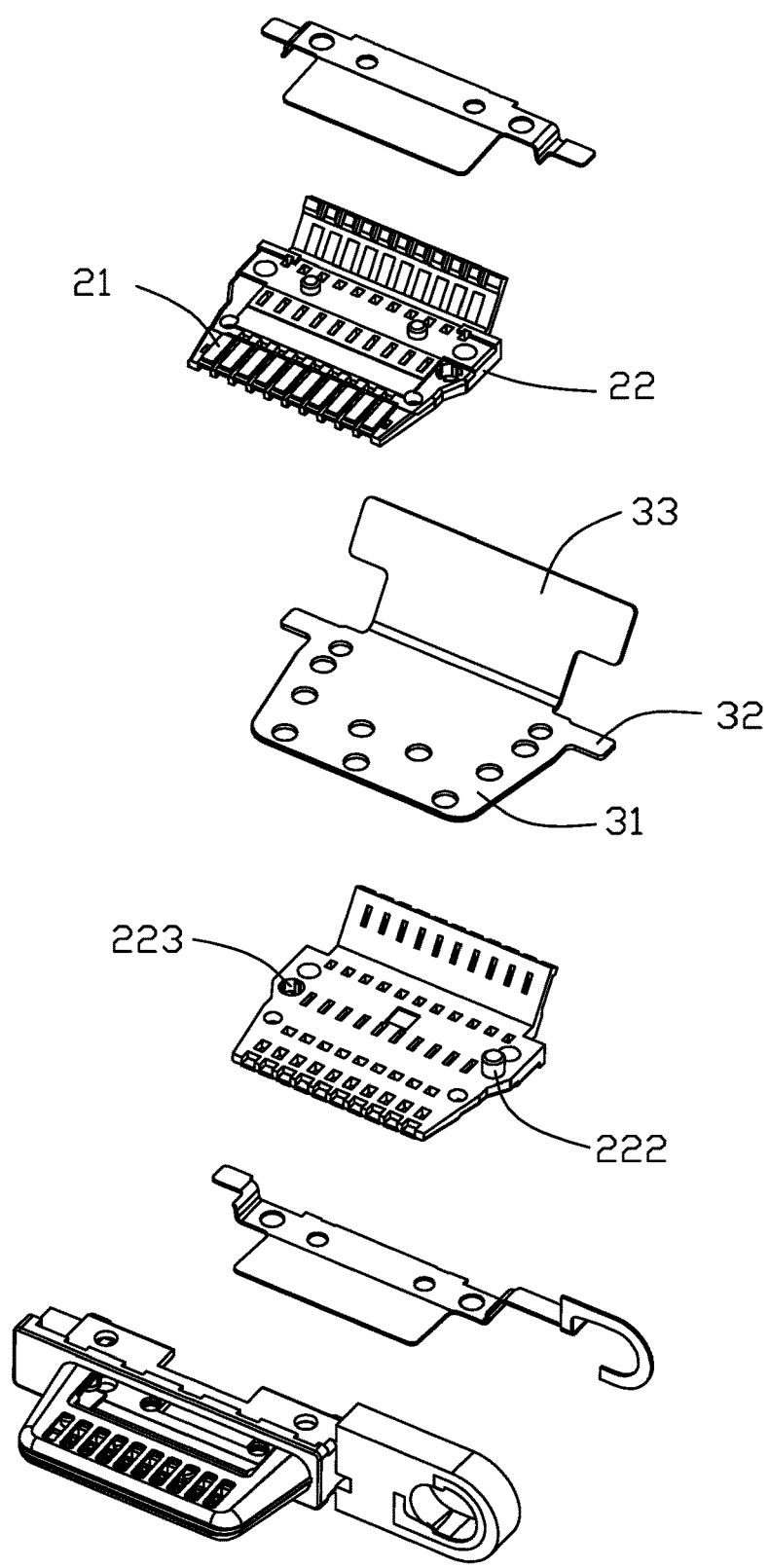
FIG. 7 is another further exploded perspective view of the portion of the electrical connector of FIG. 5.
Figure 8:
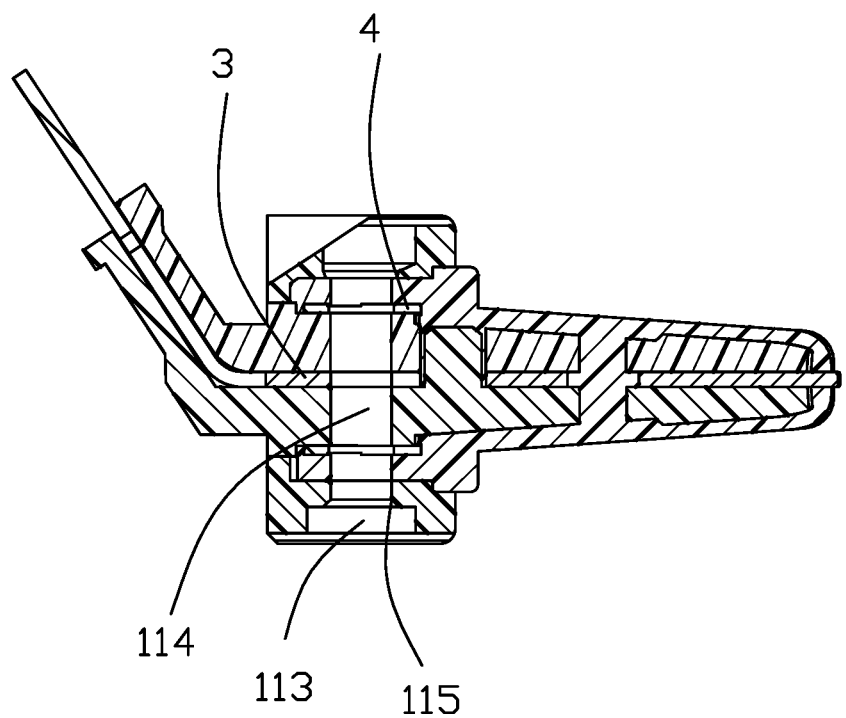
FIG. 8 is a cross-sectional view of the electrical connector of FIG. 1 along line 8-8'.

Reference will now be made in detail to the embodiments of the present disclosure. The reference numerals are referred to the different embodiments, respectively.

An electrical connector 100 includes three connector units 101, 102, 103 retained together by an insulative rear housing 1. Each connector unit 101, 102, 103 includes a forward mating tongue 6. The middle connector unit 102 has a wider mating tongue 6 than the connector unit 101 and 103. The mating tongue 6 forms opposite mating surfaces 61.

Each connector unit 101, 102, 103 includes a contact module (not labeled) retained, via an over-molding process, in an insulative front housing 5 which is successively retained to the rear housing 1 via another over-molding process. The contact module includes a pair of (upper/lower) terminal modules 2 sandwiching a metallic shielding plate 3 and sandwiched between a pair of metallic shells 4. The front housing 5 encloses the terminal modules 2, the shielding plate 3 and the shells 4, via a (first stage) over-molding process, to form the corresponding mating tongue 6. The rear housing 1 formed via another (second stage) over-molding process upon the front housing 5, forms a base 11 with a rear face 111 thereon.

Each terminal module 2 includes a plurality of terminals 21 integrally formed with an insulator 22 via an insert-molding process. The terminal 21 include a contacting section 211 exposed upon the insulator 22, a retaining section 212 hidden within the insulator 22, and a tail section 213 exposed outside of the rear face 111 in an oblique manner. The insulator 22 includes a horizontal section (not labeled) securing the retaining sections 212 and an oblique section (not labeled) securing the tail section 213. The insulator 22 includes a rear face 221. The insulators 22 have the fixing posts 222 and the corresponding fixing holes 223 for securing together. The insulator 22 forms securing posts 224 extending through the corresponding holes 411 of the shell 4 for attaching the shell 4 upon the corresponding insulator 22.

The metallic shielding plate 3 is sandwiched between the two insulators 22, and includes a main body 31, a pair of side portions 32 on two lateral sides of the main body 22, and an extension 33 extending from a rear end of the main body 31 and sandwiched between two oblique sections of the two insulators 22. The main body 31 has the through holes (not labeled) through which the fixing posts 222 extend.

The metallic shell 4 includes an abutment section 41, a contacting region 42 extending forwardly from the abutment section 41 toward the contacting section 211 of the contacts 21, a rear end region 44 one a rear side of the abutment section 41, and a pair of ears 43 extending from two opposite lateral ends of the abutment section 41 initially toward the metallic shielding plate 3 and successively outwardly and laterally to mechanically and electrically connect to the side portions 32 of the shielding plate 3. The rear end region 44 forms a rear face/edge 441. The contact region 42 is exposed upon the mating surface 61 behind the contacting sections 211. The insulator 22 forms a notch (not labeled) through the rear face 221 to allow the rear end region 44 to extend rearward therethrough. The insulator 22 forms a recessed surface 225 in the notch. The insulator 22 further forms a plurality of escaping holes 226 extending through the recessed surface 225. The shell 4 covers the escaping holes 226. Understandably, the recessed surface 225 could be coplanar with the rear face 441 or in front thereof. In addition, the recessed surface 225 may be formed on the insulator 22 of the upper terminal module too.

Figure 9:
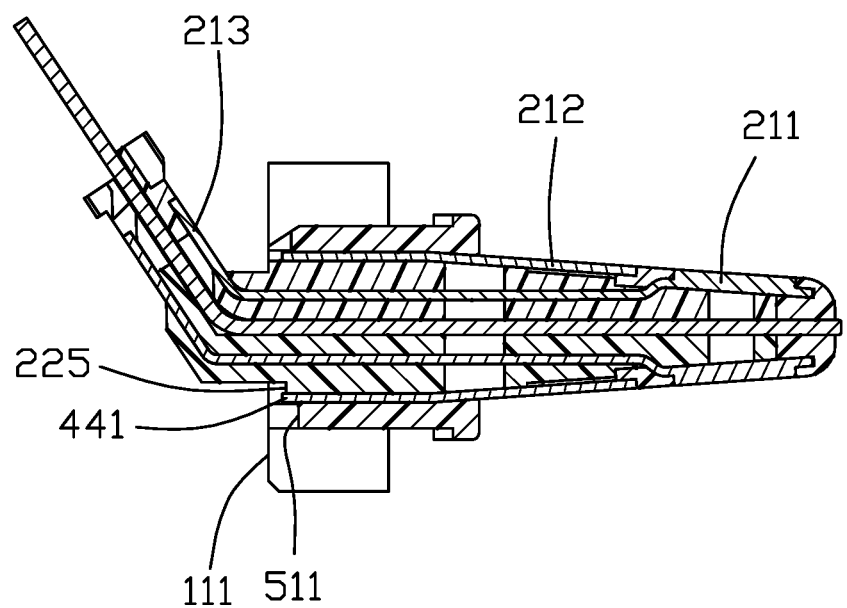
FIG. 9 is another cross-sectional view of electrical connector of FIG. 1 along line 9-9 without showing the rear housing.
Figure 10:
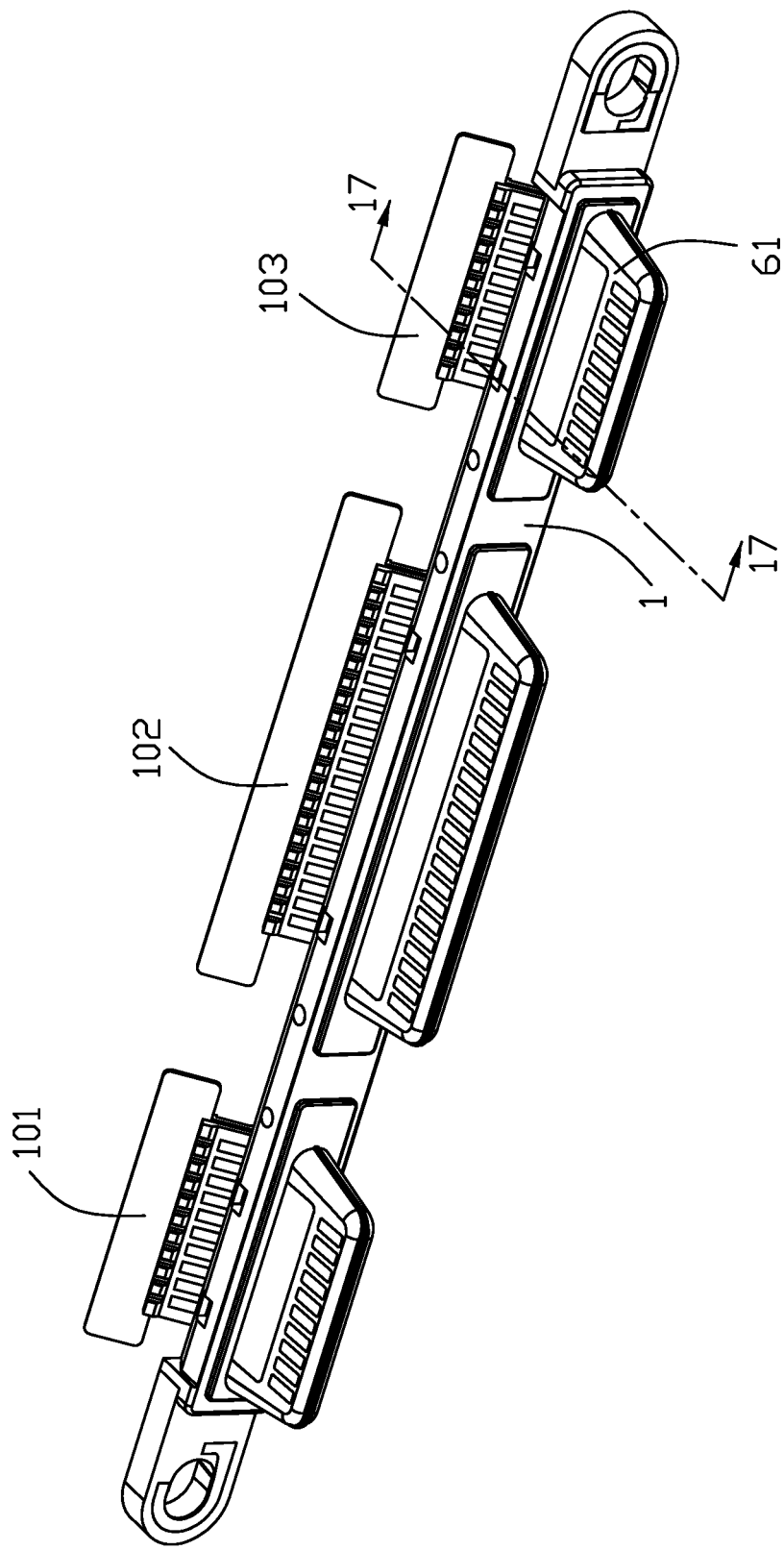
FIG. 10 is a perspective view of the electrical connector according to a second embodiment of the invention.
Figure 11:
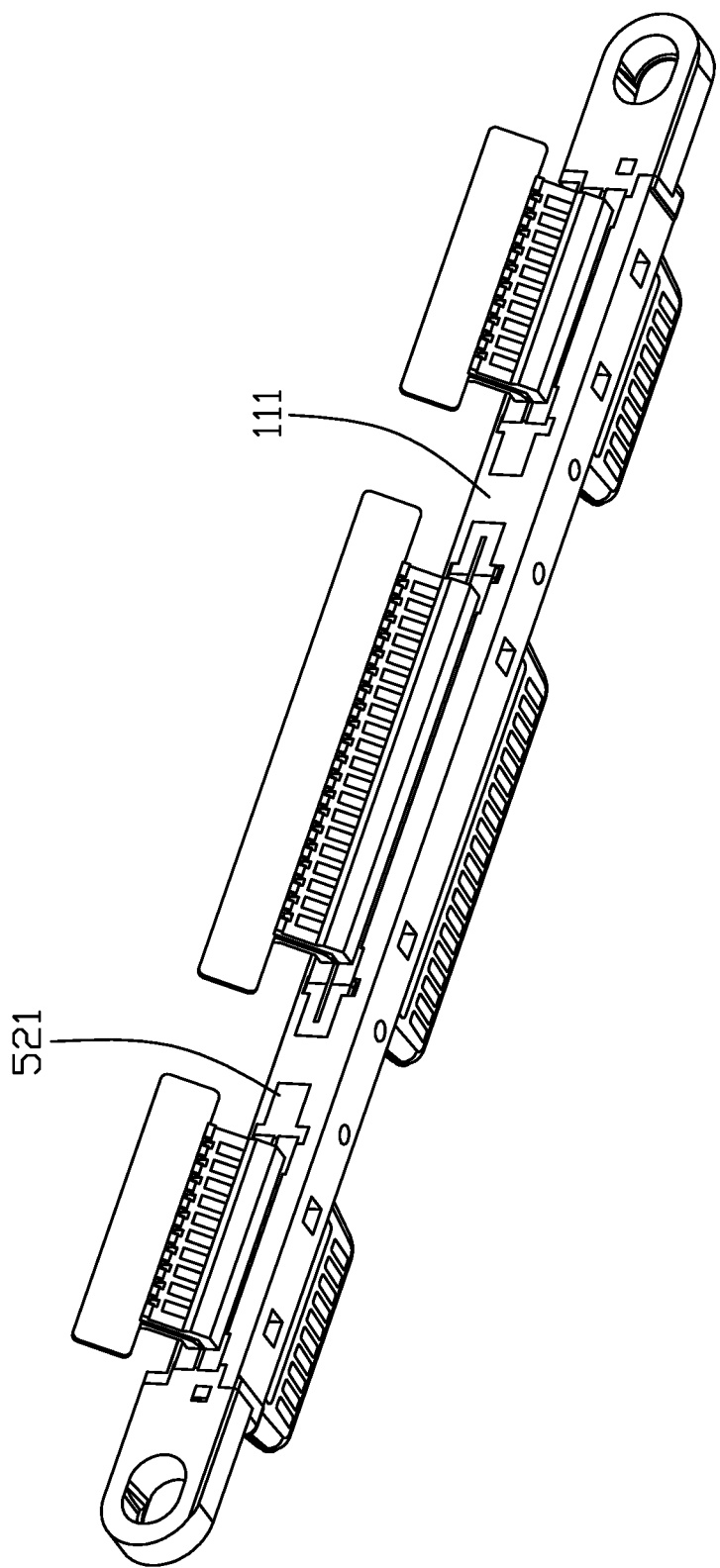
FIG. 11 is another perspective view of the electrical connector of FIG. 10.
Figure 12:
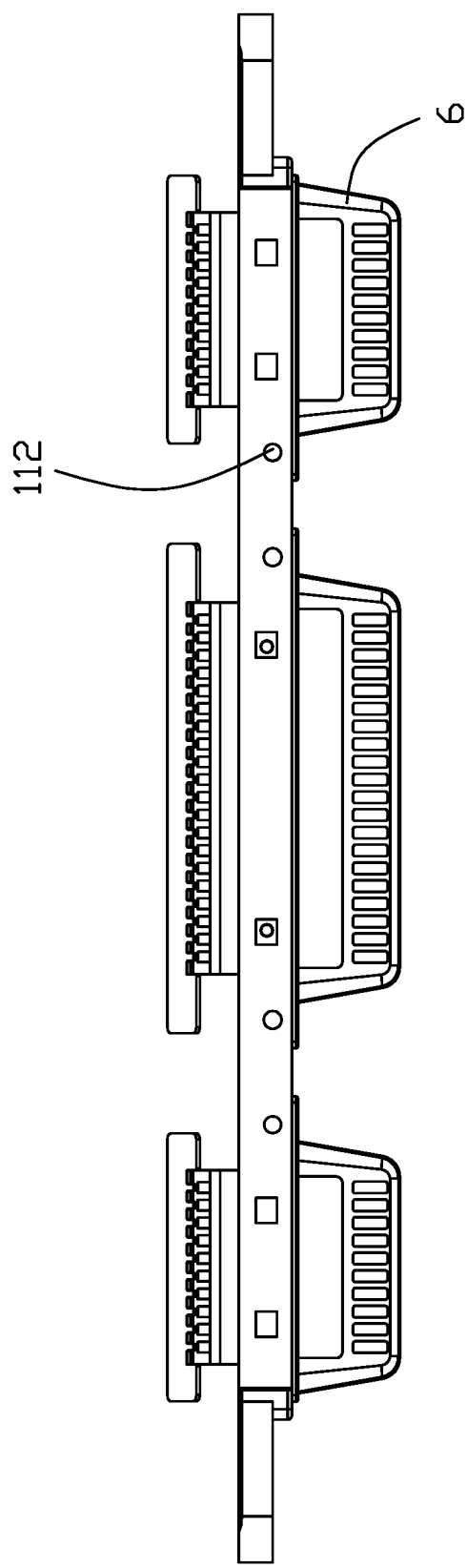
FIG. 12 is a top view of the electrical connector of FIG. 10.
Figure 13:
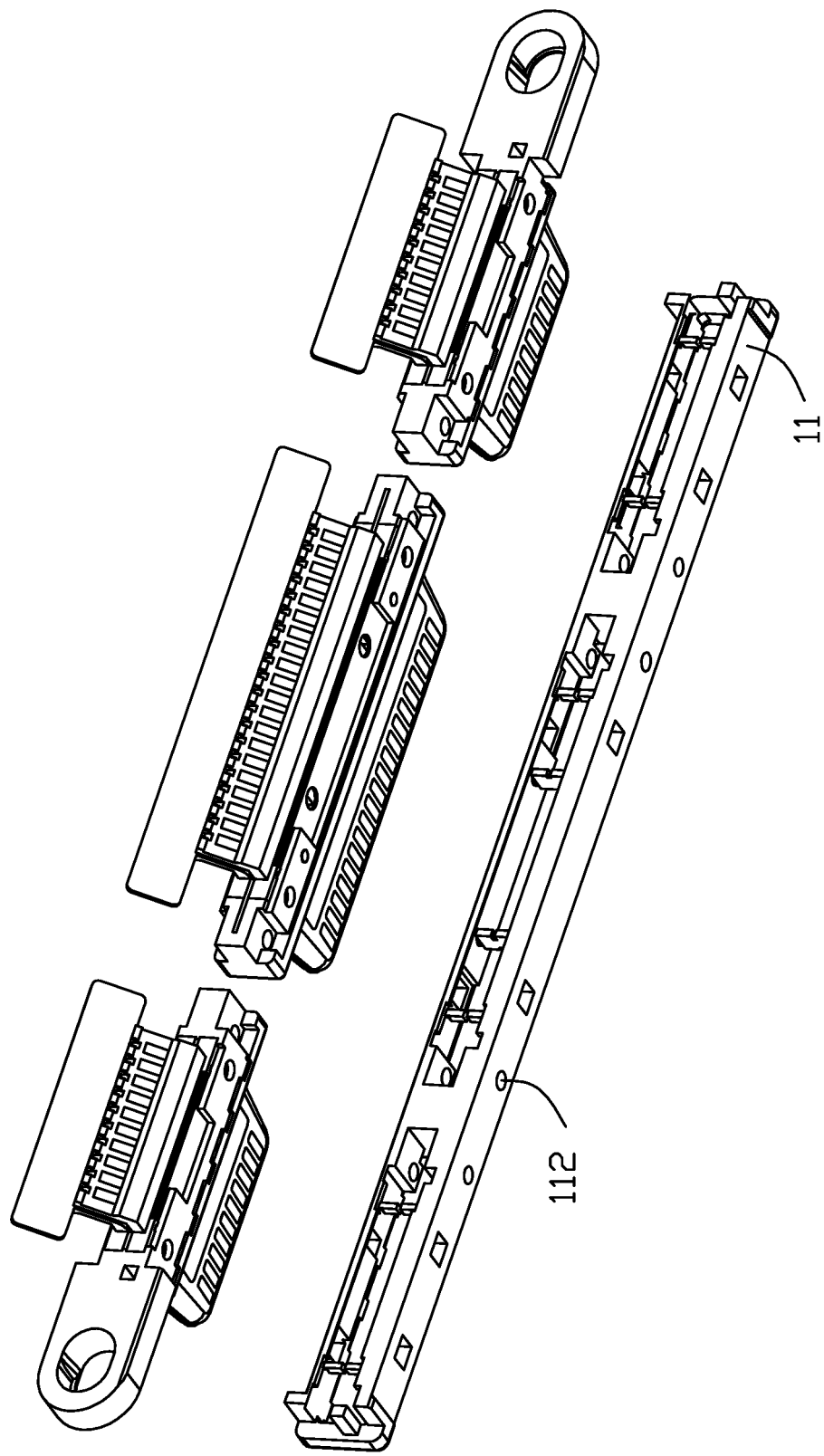
FIG. 13 is an exploded perspective view of the electrical connector of FIG. 10.
Figure 14:
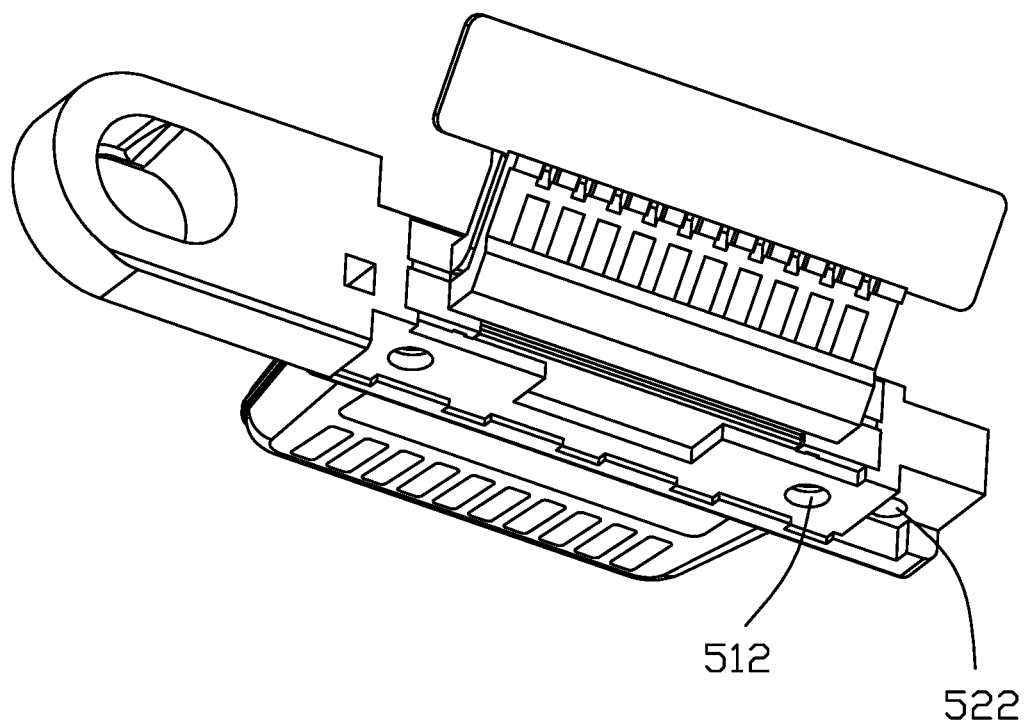
FIG. 14 is an enlarged perspective view of a portion of the electrical connector of FIG. 13.
Figure 15:
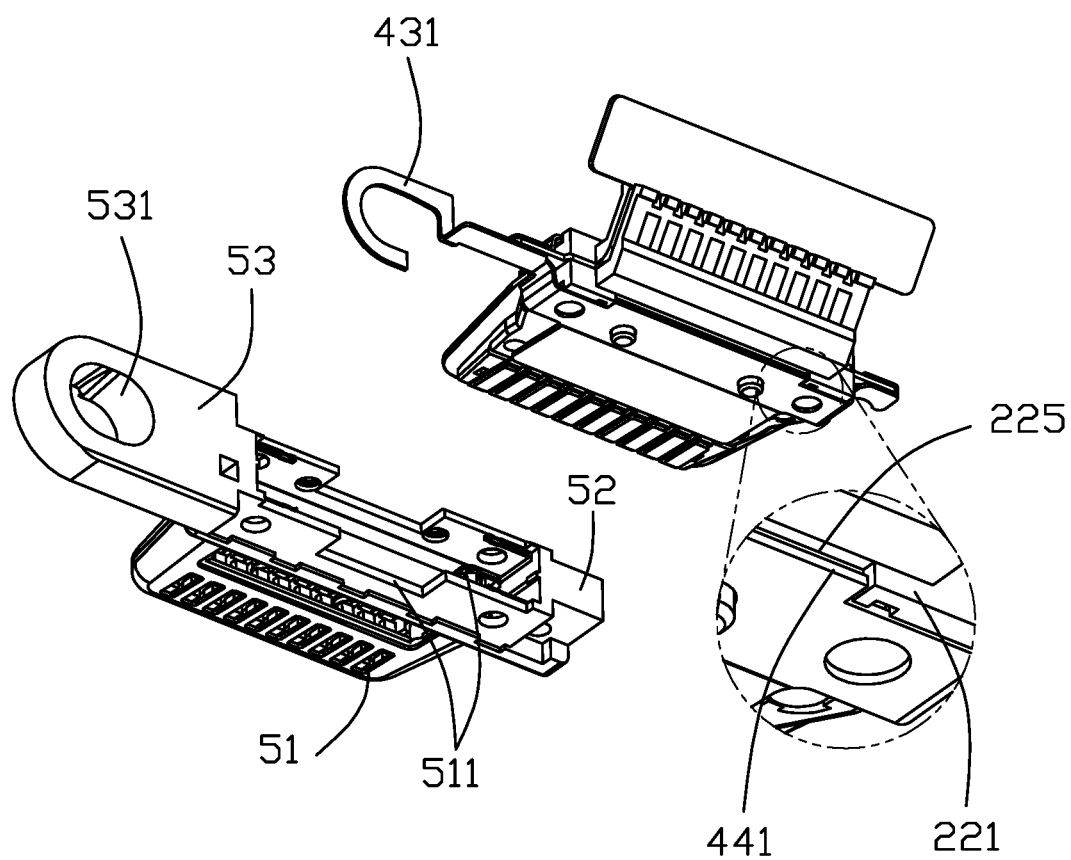
FIG. 15 is an exploded perspective view of the portion of the electrical connector of FIG. 14.
Figure 16:
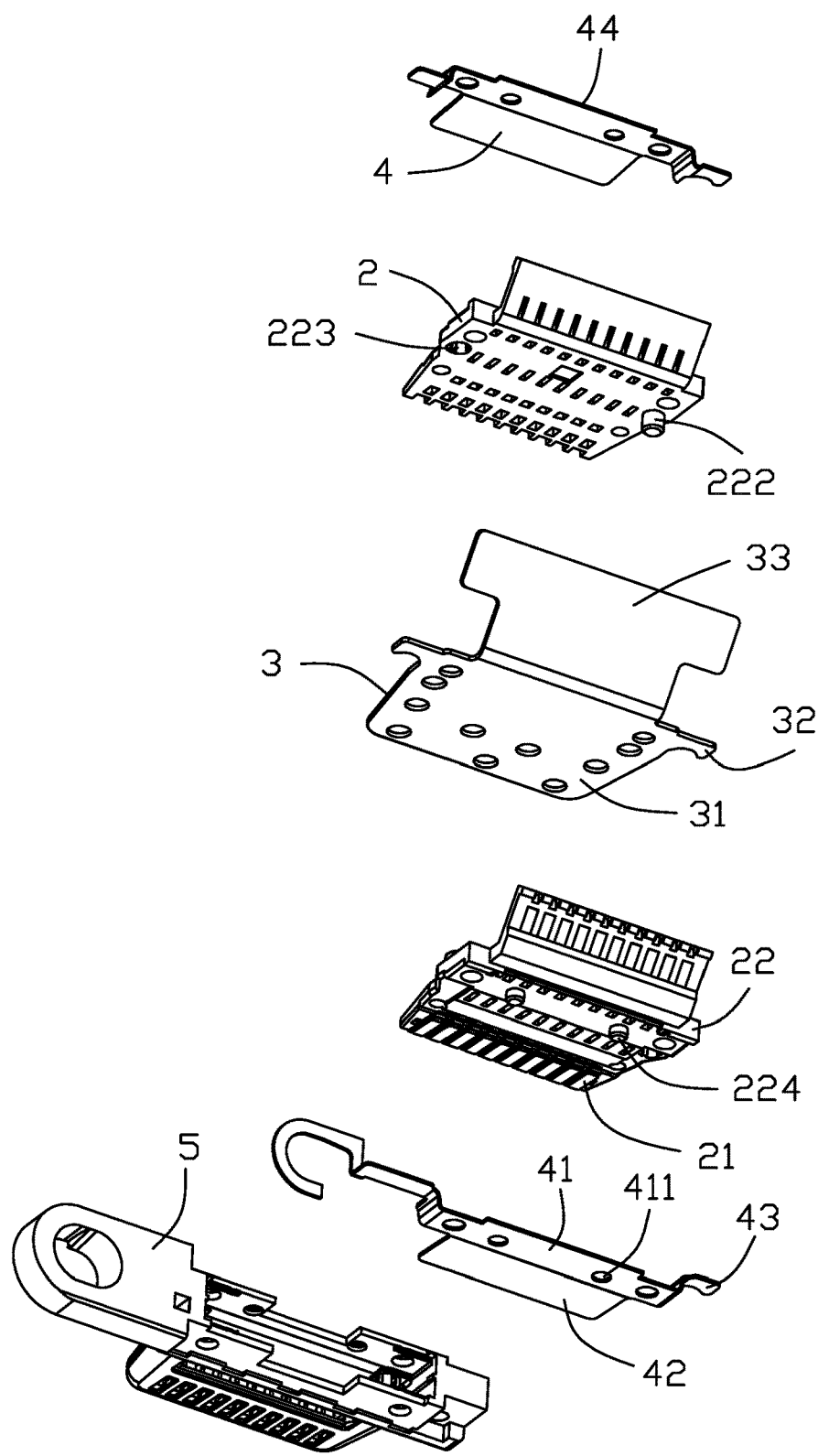
FIG. 16 is a further exploded perspective view of the portion of the electrical connector of FIG. 15.
Figure 17:
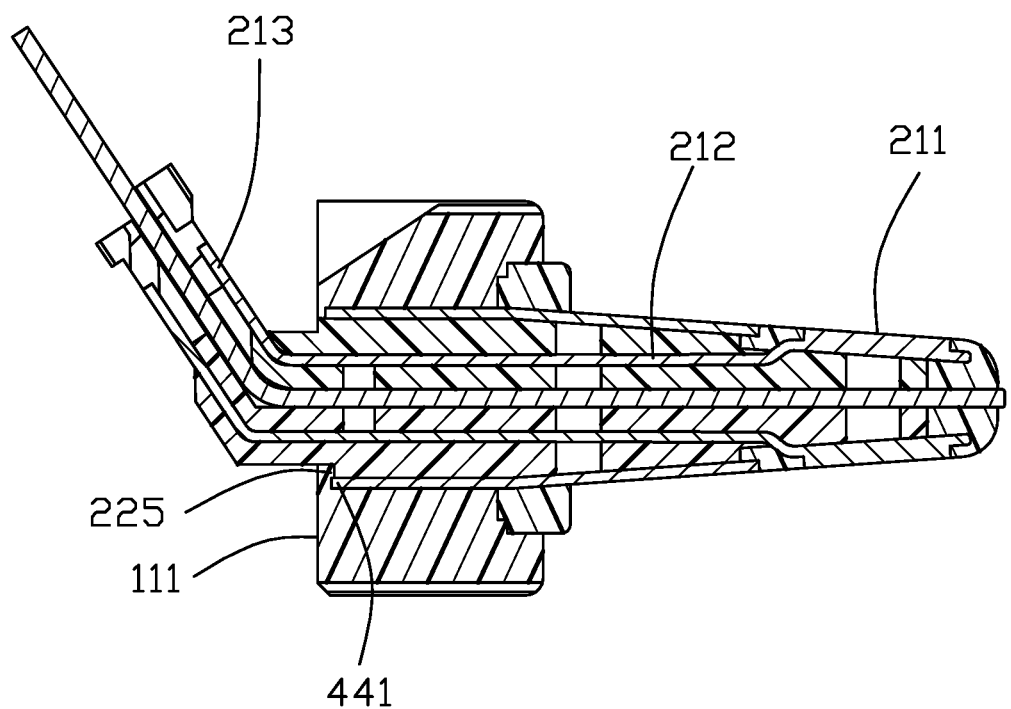
FIG. 17 is a cross-sectional view of the electrical connector of FIG. 10 along line 17-17.

The front housing 5 includes a covering section 51 and a pair of side sections 51 by two sides. The covering section 51 covers the shells 4 and the pair of terminal modules 2 to form the mating tongue 6. The covering section 51 includes a rear face 511 located in front of the rear face 441. The side section 51 has a rear face 521 coplanar with the rear face 111 of the base 11. Notably, according to FIG. 9 in which the rear housing 1 is removed, when the rear housing 1 is applied upon the front housing 5, the rear housing 1 will cover the rear face 441 of the shell 4, the rear face 511 of the front housing 5, the recessed surface 225 of the insulator 22 and the escaping holes 226, thus not only avoiding the potential shorting risk between the rear face 441 and the sputtering layer (not shown) but also reinforcing the structure of the whole connector. The shell 4 of the connector unit 101, 103 further includes a mounting ear 43 with a hook 431 thereof. The front housing 5 forms a mounting section 53 with a mounting hole 431 enclosing the hook 431. Notably, the side portion 32 of the shielding plate 3 of the connector unit 102 is rearward exposed to an exterior on the rear face 111 of the base 11 while that of the connector unit 101, 103 are not.

The base 11 has a plurality of positioning holes 112. In fact, the positioning hole 112 is constituted by the contact module, which includes the pair of terminal modules 2 and the shielding plate 3 an the pair of shell 4, with the housing 5 and the rear housing 1 together. The positioning hole 112 has a dumbbell cross-section with a pair of outer holes 113 exposed upon the surfaces of the base 11 in the vertical direction, and an inner hole 114 between the pair of outer holes 113. The outer holes 113 are diametrically larger than the inner hole 114. A tapered transition hole 115 is formed between the outer hole 113 and the inner hole 114.

Because the positioning hole 112 extends through the rear housing 6, the front housing 5, the pair of metallic shells 4, the pair of terminal modules 2 and the metallic shielding plate 3 to expose the rim structure of the shielding plate 3 and the rim structures of the pair of metallic shells 4 therein, there is a potential risk to be shorted with the sputtering layer (not shown) which is later applied upon the rear housing 1. Therefore, the positioning hole 112 is filled with glue to isolate the rim structures of the shielding plate 3 and those of the shell 4 on a periphery of the positioning hole 112 from the exterior. Because of the dumbbell configuration, the fluidal glue easily enters the positioning hole 112 and the solidified glue is hard to be withdrawn from the positioning hole 112.

It is noted that before forming the rear housing 1, the positioning hole 112 is formed in/by the pair of terminal modules 2, the shielding plate 3 and the pair of shells 4 for receiving the core pin of the mold during applying the front housing 5 thereupon via the (first stage) over-molding process. In this embodiment, when the rear housing 1 is further applied upon the front housing 5 to be formed during another (second stage) over-molding process, the same positioning hole is used for the core pin of another mold. This is the reason why the shielding plate rim and the metallic shell rim are exposed in the positioning hole after the rear housing 1 is formed. Alternately, if in the second stage over-molding process to form the rear housing 1, the positions of the positioning holes are changed/moved not to be aligned with the original positioning holes, the original positioning holes in the first stage over-molding process will be filled by the rear housing 6, thus also avoiding the potential shorting risk. This will be another anti-shorting arrangement as described in the second embodiment below.

Referring to FIGS. 10-17, the electrical connector 100 includes three connector units 101, 102, 103 retained to the insulative rear housing 1. Each of the connector units 101, 102, 103 has a mating tongue 6. The rear housing 1 forms a base 11 with a rear face 111 thereon.

Each connector unit 101, 102, 103 includes a contact module (not labeled) retained, via a (first stage) over-molding process, in an insulative front housing 5 which is successively retained to the rear housing 1 via another (second stage) over-molding process. The contact module includes a pair of (upper/lower) terminal modules 2 sandwiching a metallic shielding plate 3 and sandwiched between a pair of metallic shells 4. The front housing 5 encloses the terminal modules 2 via a first stage over-molding process, the shielding plate 3 and the shells 4 to form the corresponding mating tongue 6. The rear housing 1 forms a base 11 with a rear face 111 thereon, and the mating tongue 6 extends forwardly from the base 11 in the front-to-back direction.

Each terminal module 2 includes a plurality of terminals 21 integrally formed with an insulator 22 via an insert-molding process. The terminal 21 include a contacting section 211 exposed upon the insulator 22, a retaining section 212 hidden within the insulator 22, and a tail section 213 exposed outside of the rear face 111 in an oblique manner. The insulator 22 includes a horizontal section (not labeled) securing the retaining sections 212 and an oblique section (not labeled) securing the tail section 213. The insulator 22 includes a rear face 221. The insulators 22 have the fixing posts 222 and the corresponding fixing holes 223 for securing together. The insulator 22 forms securing posts 224 extending through the corresponding holes 411 of the shell 4 for attaching the shell 4 upon the corresponding insulator 22.

The metallic shielding plate 3 is sandwiched between the two insulators 22, and includes a main body 31, a pair of side portions 32 on two lateral sides of the main body 22, and an extension 33 extending from a rear end of the main body 31 and sandwiched between two oblique sections of the two insulators 22. The main body 31 has the through holes (not labeled) through which the fixing posts 222 extend.

The metallic shell 4 includes an abutment section 41, a contacting region 42 extending forwardly from the abutment section 41 toward the contacting section 211 of the contacts 21, a rear end region 44 one a rear side of the abutment section 41, and a pair of ears 43 extending from two opposite lateral ends of the abutment section 41 initially toward the metallic shielding plate 3 and successively outwardly and laterally to mechanically and electrically connect to the side portions 32 of the shielding plate 3. The rear end region 44 forms a rear face/edge 441. The contact region 42 is exposed upon the mating surface 61 behind the contacting sections 211. The insulator 22 forms a notch (not labeled) through the rear face 221 to allow the rear end region 44 to extend rearward therethrough. The insulator 22 forms a recessed surface 225 in the notch. The insulator 22 further forms a plurality of escaping holes 226 extending through the recessed surface 225. The shell 4 covers the escaping holes 226. Understandably, the recessed surface 225 could be coplanar with the rear face 441 or in front thereof. In addition, the recessed surface 225 may be formed on the insulator 22 of the upper terminal module too.

The front housing 5 includes a covering section 51 and a pair of side sections 51 by two sides in the transverse direction. The covering section 51 covers the shells 4 and the pair of terminal modules 2 to form the mating tongue 6. The covering section 51 includes a rear face 511 located in front of the rear face 441. The side section 51 has a rear face 521 coplanar with the rear face 111 of the base 11. Notably, according to FIG. 9 in which the rear housing 1 is removed, when the rear housing 1 is applied upon the front housing 5, the rear housing 1 will simultaneously cover the rear face 441 of the shell 4, the rear face 511 of the front housing 5, the recessed surface 225 of the insulator 22 and the escaping holes 226, thus not only avoiding the potential shorting risk between the rear face 441 and the sputtering layer (not shown) but also reinforcing the structure of the whole connector. The shell 4 of the connector unit 101, 103 further includes a mounting ear 43 with a hook 431 thereof. The front housing 5 forms a mounting section 53 with a mounting hole 431 enclosing the hook 431. Notably, the side portion 32 of the shielding plate 3 of the connector unit 102 is rearward exposed to an exterior on the rear face 111 of the base 11 while those of the connector unit 101, 103 are not.

Different from the same/aligned positioning hole(s) during the first stage over-molding process and the second over-molding process in the first embodiment, in the second embodiment on one hand, the covering section 51 of the front housing 5 forms a pair of first positioning holes 512 extending through the main body 31 of the shielding plate 3, the abutment sections 41 of the metallic shell 4 and the horizontal section (not labeled) of the insulator 22 so as to have the rim structure of the shielding plate 3 and those of the metallic shells 4 are exposed within the positioning hole 512. On the other hand, the side sections 52 form through holes 522 extending through the opposite surfaces in the vertical direction. In this embodiment, each of the connector units 101, 103 has only one through hole while the connector unit 102 has a pair by two sides. Correspondingly, the rear housing 1 has corresponding through holes aligned with the corresponding through holes 522, respectively, in the vertical direction so as to join with the through holes to form the second positioning hole 112. Because the through hole 522 only extends through the front housing 5, the second positioning hole 112 will not expose any part of the shielding plate 3 or the metallic shell 4. Therefore, no shorting risk exists when the sputter layer is further applied upon the combined front housing 5 and rear housing 1.

The method of making the electrical connector includes the following steps:

(1) providing a pair of terminal modules each with a plurality of terminals integrally formed within an insulator via an insert-molding process;

(2) providing a metallic shielding plate sandwiched between the pair of terminal modules in the vertical adirectin;

(3) providing a pair of metallic shells commonly sandwiching, in the vertical direction, the pair of terminal modules, including the shielding plate therebetween;

(4) providing semi-finished first positioning holes each extending through all the metal shells, the terminal modules and the shielding plate;

(5) providing first core pins extending through the corresponding positioning holes, respectively, for aligning the shells, the terminal modules and the shielding plate together, and second core pins beside the first core pins transversely spaced from the shells, the terminal modules and the shielding plate;

(6) forming an insulative front housing upon the pair of metallic shells via an over-molding process to form the corresponding connector units 101, 102, 103;

(7) removing the first positioning core pins to leave the complete first positioning holes empty and removing the second core pins to form the corresponding semi-finished second positioning holes;

(8) forming an insulative rear housing upon the front housing via another over-molding process by providing a plurality of third core pins extending through the corresponding semi-finished second positioning holes, respectively; and (9) Removing the third core pins from the rear housing to leave the complete connector wherein the complete first positioning holes are filled with material of the rear housing so as to veil the rim structures of the shielding plate and those of the shells in the first positioning holes, and the complete second positioning holes are exposed to an exterior and formed by only the front housing and the rear housing without involvement of the shielding plate, the terminal modules or the metallic shells.

In brief, both embodiments show the structures for preventing the potential shorting risk by veiling the exposed metallic portion of both the metallic shielding plate 3 and the metallic shells 4. Specifically, the first embodiment discloses each of the positioning holes extends through all the metallic shielding plate, the insulators of pair of terminal modules, the pair of metallic shells, the front housing and the rear housing with the glue therein while the second embodiment discloses two sets of positioning holes offset from each other wherein one set are filled with the material of the rear housing and the other set are vacant.

While a preferred embodiment in accordance with the present disclosure has been shown and described, equivalent modifications and changes known to persons skilled in the art according to the spirit of the present disclosure are considered within the scope of the present disclosure as described in the appended claims.

What is claimed is:

1. An electrical connector comprising:
a pair of terminal modules sandwiching a metallic shielding plate therebetween in a vertical direction, each of said terminal modules including a plurality of terminals integrally formed within an insulator via an insert-molding process;
a pair of metallic shells commonly sandwiching the pair of terminal modules therebetween in the vertical direction;
an insulative front housing applied upon the pair of metallic shells via an over-molding process with assistance of a set of positioning holes;
an insulative rear housing applied upon the front housing via another over-molding process with assistance of another set of positioning holes; wherein
the set of positioning holes are filled with material of the rear housing if the set of positioning holes are transversely offset from said another set of positioning holes; both the set of positioning holes and said another set of positioning holes are filled with glue if the set of positioning holes are aligned with said another set of positioning holes in the vertical direction, respectively.

2. The electrical connector as claimed in claim 1, wherein each of said set of positioning holes extends through all the metallic shells, the terminal modules and shielding plate in the vertical direction.

3. The electrical connector as claimed in claim 1, wherein when the set of positioning holes are offset transversely from said another set of positioning holes, each of said another set of positioning holes extends only through the front housing and the rear housing in the vertical direction.

4. The electrical connector as claimed in claim 3, wherein the front housing forms a mating tongue on which contacting section of the contacts are exposed in the vertical direction, and said set of positioning hole are aligned with the mating tongue in a front-to-back direction perpendicular to the vertical direction while said another set of positioning holes are not aligned with the mating tongue in the front-to-back direction.

5. The electrical connector as claimed in claim 1, wherein the metallic shell includes a rear edge which is located behind a rear face of the insulator and a rear face of the front housing while in front of a rear face of the rear housing, so as to be covered by the rear housing without exposure to an exterior.

6. The electrical connector as claimed in claim 1, wherein when the set of positioning holes are aligned with said another set of positioning holes in the vertical direction respectively, each of said another set of positioning hole has opposite outer holes diametrically larger than the aligned one of said set of positioning holes.

7. The electrical connector as claimed in claim 6, wherein each of said set of positioning holes cooperates with the aligned one of said another set of positioning holes to commonly form a dumbbell configuration so as to avoid withdrawal of the glue filled therein.

8. A method of making an electrical connector comprising steps of:
providing a pair of terminal modules each with a plurality of terminals integrally formed within an insulator via an insert-molding process;
providing a metallic shielding plate sandwiched between said pair of terminal modules in a vertical direction;
providing a pair of metallic shells commonly sandwiching the pair of terminal modules therebetween in the vertical direction;
providing a first set of positioning holes each extending through all the pair of metallic shells, the terminal modules and the shielding plate in the vertical direction;
forming an insulative front housing upon the pair of terminal modules via a first stage over-molding process by assistance of a plurality of first core pins received within the first set positioning holes, respectively, wherein a second set of positioning holes are formed in the front housing; and
forming an insulative rear housing upon the front housing via a second stage over-molding process by assistance of a plurality of second core pins received within the corresponding second set of positioning holes; wherein
if the second set of positioning holes are respectively aligned with the first set of positioning holes in the vertical direction, both the first set of positioning holes and the corresponding second set of positioning holes are filled with glue;
if the second set of positioning holes are respectively transversely offset from the first set of positioning holes, the first set of positioning holes are filled with material of the rear housing and the second set of positioning holes are either filled or empty.

9. The method as claimed in claim 8, wherein when the second set of positioning holes are offset from the first set of positioning holes, each the second set of positioning holes extends only through the front housing and the rear housing.

10. The method as claimed in claim 8, wherein when the front housing forms a mating tongue with contacting sections of the terminals exposed thereon in the vertical direction, and the first set of positioning holes are aligned with the mating tongue in a front-to-back direction perpendicular to the vertical direction.

11. The method as claimed in claim 8, wherein the metallic shell includes a rear edge which is located behind a rear face of the insulator and a rear face of the front housing while in front of a rear face of the rear housing, so as to be covered by the rear housing without exposure to an exterior.

12. The method as claimed in claim 8, wherein when the second set of positioning holes are respectively aligned with the first set of positioning holes in the vertical direction, each of said second set of positioning holes is diametrically larger than the corresponding one of said first set of positioning holes.

13. The method as claimed in claim 12, wherein each of the first set of positioning holes and the corresponding one of the second set of positioning holes commonly forms a dumbbell configuration.

14. An electrical connector comprising:
a pair of terminal modules sandwiching a metallic shielding plate therebetween in a vertical direction, each of said terminal modules including a plurality of terminals integrally formed within an insulator via an insert-molding process;

a pair of metallic shells commonly sandwiching the pair of terminal modules therebetween in the vertical direction;

an insulative front housing applied upon the pair of metallic shells via an over-molding process with assistance of a first set of positioning holes;

an insulative rear housing applied upon the front housing via another over-molding process with assistance of a second set of positioning holes; wherein the front housing forms a mating tongue on which contacting sections of the terminals are exposed to an exterior in the vertical direction, and the first set of positioning holes are aligned with the mating tongue in the front-to-back direction while the second set of positioning holes are either aligned with the mating tongue in the front-to-back direction or transversely offset therefrom; wherein the metallic shell includes a rear edge which is located behind a rear face of the insulator and a rear face of the front housing while in front of a rear face of the rear housing, so as to be covered by the rear housing without rearward exposure to an exterior along a front-to-back direction perpendicular to the vertical direction.

15. The electrical connector as claimed in claim 14, wherein each of first set of positioning holes extends through all the pair of metallic shells, the insulators of the pair of terminal modules and the shielding plate.

16. The electrical connector as claimed in claim 15, wherein said second set of positioning holes are aligned with the mating tongue in the front-to-back direction, and further respectively aligned the first set of positioning holes in the vertical direction.

17. The electrical connector as claimed in claim 16, wherein both the first set of positioning holes and the second set of positioning holes are filled with glue.

18. The electrical connector as claimed in claim 17, wherein each of the first set of positioning holes and the corresponding one of said second set of positioning holes commonly defines a dumbbell configuration.

19. The electrical connector as claimed in claim 15, wherein each of the second set of positioning holes extends through only the front housing and the rear housing.

* * * * *